US007076362B2

(12) United States Patent
Ohtsuji et al.

(10) Patent No.: US 7,076,362 B2
(45) Date of Patent: Jul. 11, 2006

(54) AUDIO INTERACTIVE NAVIGATION SYSTEM, MOVING TERMINAL DEVICE, AND AUDIO INTERACTIVE SERVER

(75) Inventors: Shinya Ohtsuji, Tokai (JP); Soshiro Kuzunuki, Hitachinaka (JP); Mariko Okude, Hitachi (JP); Tadashi Kamiwaki, Tokai (JP); Michio Morioka, Hitachi (JP); Akio Amano, Tokyo (JP); Toshihiro Kujirai, Tokyo (JP); Makoto Shioya, Tokyo (JP); Manabu Niie, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/082,309

(22) Filed: Feb. 26, 2002

(65) Prior Publication Data

US 2002/0156570 A1    Oct. 24, 2002

(30) Foreign Application Priority Data

Apr. 23, 2001  (JP) .............................. 2001-123759

(51) Int. Cl.
*G06F 17/30*  (2006.01)
(52) U.S. Cl. ................ 701/211; 701/200; 701/208; 701/207; 709/203; 709/217; 709/219
(58) Field of Classification Search ................ 701/200, 701/211, 207–208; 340/989, 991, 993, 384.1; 73/178 R; 709/217, 203, 219; 707/10; G06F 17/30, G06F 15/16; H04N 7/173, 27/173
See application file for complete search history.

(56) References Cited

U.S. PATENT DOCUMENTS

| | | | | |
|---|---|---|---|---|
| 5,406,492 A | * | 4/1995 | Suzuki | ...................... 701/211 |
| 5,592,389 A | * | 1/1997 | La Rue et al. | ............... 701/211 |
| 5,729,109 A | * | 3/1998 | Kaneko et al. | .............. 318/587 |
| 5,903,228 A | * | 5/1999 | Ohgaki et al. | ............ 340/995.1 |
| 5,928,308 A | * | 7/1999 | Nanba et al. | ................ 701/211 |
| 6,208,932 B1 | * | 3/2001 | Ohmura et al. | .............. 701/200 |
| 2003/0065427 A1 | * | 4/2003 | Funk et al. | |
| 2003/0194065 A1 | * | 10/2003 | Langseth et al. | ......... 379/88.18 |

(Continued)

FOREIGN PATENT DOCUMENTS

EP     1408692 A1 *  4/2004

(Continued)

OTHER PUBLICATIONS

Whitfield, Telematics for the people: falling electronics and software costs and new approaches promise to move navigation systems out of the realm of pricey gadget and into mainstream use faster than you might think, from LookSmart, Automative Design & Production, May 2004, 2 pages.*

(Continued)

*Primary Examiner*—Cuong H Nguyen
(74) *Attorney, Agent, or Firm*—Crowell & Moring LLP

(57) ABSTRACT

The present invention is characterized in that the car navigation system for, at the time of desiring map information, traffic information, and other required information in a car, inquiring an information distribution service provider for distribution the information is composed of a moving terminal device which can be operated by inputting and outputting voice, a communication device, an audio interactive server which can input and output voice and data, is connected to an external device and the Internet on the basis of audio interactions by the voice recognition process and voice synthesis process, and executes information transfer, and one or a plurality of information distribution service providers connected to the Internet for distributing information such as map information and traffic information.

2 Claims, 12 Drawing Sheets

U.S. PATENT DOCUMENTS

| | | |
|---|---|---|
| 6,351,698 B1 * | 2/2002 | Kubota et al. ................ 701/51 |
| 6,381,535 B1 | 4/2002 | Durocher et al. |
| 6,401,029 B1 * | 6/2002 | Kubota et al. .............. 701/201 |
| 6,526,335 B1 * | 2/2003 | Treyz et al. .................... 701/1 |
| 6,529,826 B1 * | 3/2003 | Kawai et al. ................ 701/211 |
| 6,539,080 B1 * | 3/2003 | Bruce et al. ............. 379/88.17 |
| 6,571,279 B1 * | 5/2003 | Herz et al. .................. 709/217 |
| 6,587,786 B1 * | 7/2003 | La Rue ....................... 701/211 |
| 2001/0029425 A1 * | 10/2001 | Myr |
| 2002/0049535 A1 * | 4/2002 | Rigo et al. |
| 2002/0057678 A1 * | 5/2002 | Jiang et al. |
| 2002/0065606 A1 * | 5/2002 | Kawai et al. ................ 701/211 |

FOREIGN PATENT DOCUMENTS

| | | |
|---|---|---|
| FR | 2 762 906 | 11/1998 |
| JP | 10-104002 | 4/1998 |
| JP | 10-104007 | 4/1998 |
| JP | 10-177469 | 6/1998 |
| JP | 10-271223 | 10/1998 |
| JP | 10-281792 | 10/1998 |
| JP | 11-14394 | 1/1999 |
| JP | 11-118497 | 4/1999 |
| JP | 11-201771 | 7/1999 |
| JP | 2000-55691 | 2/2000 |
| JP | 2000-268297 | 9/2000 |
| JP | 2000-322699 | 11/2000 |
| JP | 2000-351352 | 12/2000 |
| JP | 2001-133272 | 5/2001 |
| JP | 2001-141475 | 5/2001 |
| WO | WO 9617467 A2 * | 6/1996 |
| WO | WO 98/45823 | 10/1998 |
| WO | WO 01/22112 A1 | 3/2001 |
| WO | WO 01/26350 A1 | 4/2001 |

OTHER PUBLICATIONS

Unknown author, Webraska and Alcatel demonstrate new street-level maps on WAP mobile phones using positioning technology; GSM world congress—Alcatel stand F13, Business & Technology Editors, Feb. 2, 2000, Looksmart, 2 pages.*

Dubie, Voice systems go for a ride, Sep. 9, 2002, Mobile Computing, from Network World Inc., 3 pages.*

M Artels, Vehicle electronics: VDO presents its latest developments, ATZ, Feb. 1, 1983 (from Kialog® File 81 (Motor Industry Research—acc. No. 56739).*

W. Gnettner, Voice recognition in a graphic system, Eurographics '81 Proc. conference, Darmstadt, Sep. 1981 (Dialog(R) File 292, acc. No. 00067199).*

D Cott, Radio-Linked VDU expands driving information, SAE J Automot Engng, Apr. 1985 (from Dialog(R) file 81, acc. No. 49320).*

MT Jones, CPJazz—a software framework fopr vehicle systems integration and wireless connectivity, Mobile/Pervasive Technologies, AIWORC'00, Apr. 29, 2000 (from Dialog(R) File 95, acc. No. 01412925 20000507949).*

ML Philips, Voice control of remote stereoscopic systems, Adv. Resource Dev. Corp., Southeastcon '90 Proceedings, Apr. 4, 1990 (from Dialog(R) File 95, acc. No. 00508569 I91084131938).*

R Faerber et al., Speech control systems in vehicles: possibilities and restrictions, ISATA 89 Proceedings, vol. II, paper 89110, May 29, 1989 (from Dialog(R) File 81 (Motor Industry Research), acc. No. 66905).*

I Gerson et al., Voice-Activated controls in an automotive environment, ISATA 88 Proceedings, vol. 1, paper 88066 (from Dialog(R) File 81, acc. No. 63942).*

D Scott et al., Voice control joins advancing speech synthesis, SAE J Automot Engng, May 1, 1983,(from Dialog(R) File 81 acc. No. 56738).*

* cited by examiner

FIG. 4

```
<?xml version="1.0"?>
<vxml version="1.0">
 <form>
  <field name="where1">
   <prompt>
        %first_message_to_user%
   </prompt>
   <grammer src="%grammer%" type="application/x-isgf"/>
  </field>
   </block>
    <submit next="%URL%"/>
   </block>
 </form>
</vxml>
```
401

EXAMPLE OF CHARACTER STRING EMBEDDING (LOCATION DESIGNATED):
```
<?xml version="1.0"?>
<vxml version="1.0">
 <form>
  <field name="where1">
   <prompt>
        TO WHAT PLACE DO YOU GO?
   </prompt>
   <grammer src="where.gram" type="application/x-isgf"/>
  </field>
   </block>
    <submit next="http://www.dra.example/where2.asp"/>
   </block>
 </form>
</vxml>
```

INTERACTION EXECUTION EXAMPLE:
  COMPUTER:TO WHAT PLACE DO YOU GO?
  HUMAN:A PARK
  COMPUTER:NOT UNDERSTOOD
  COMPUTER:TO WHAT PLACE DO YOU GO?
  HUMAN:A PARK
  COMPUTER: (GO TO http://www.dra.example/where2.asp)

402

FIG. 10
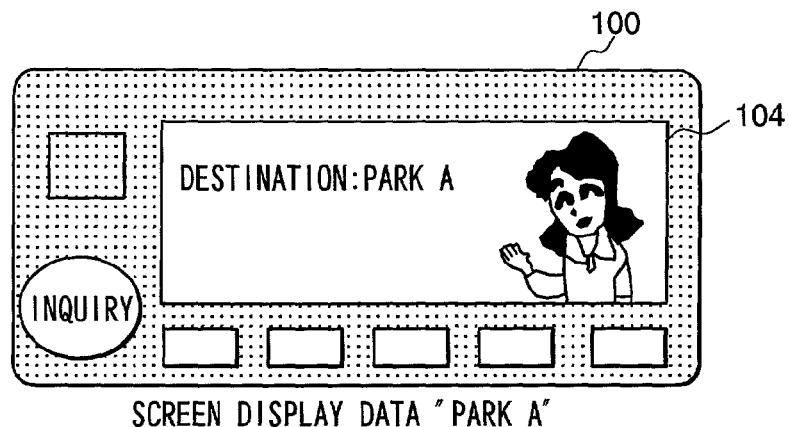
SCREEN DISPLAY DATA "PARK A"
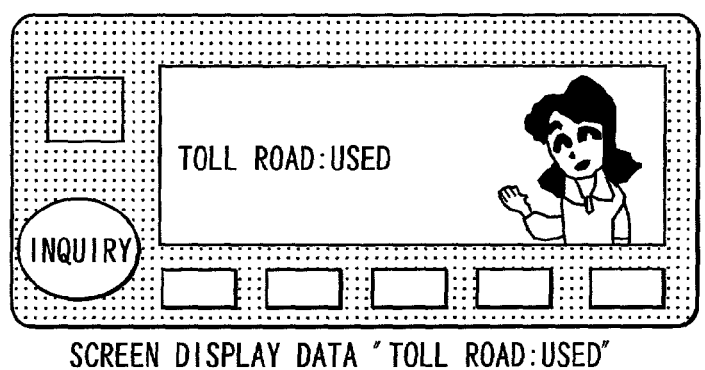
SCREEN DISPLAY DATA "TOLL ROAD:USED"
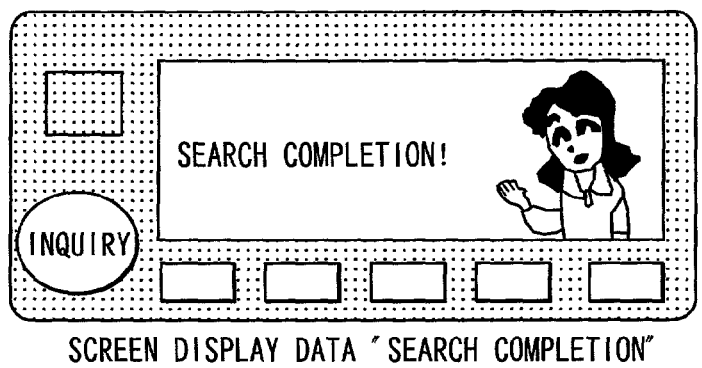
SCREEN DISPLAY DATA "SEARCH COMPLETION"
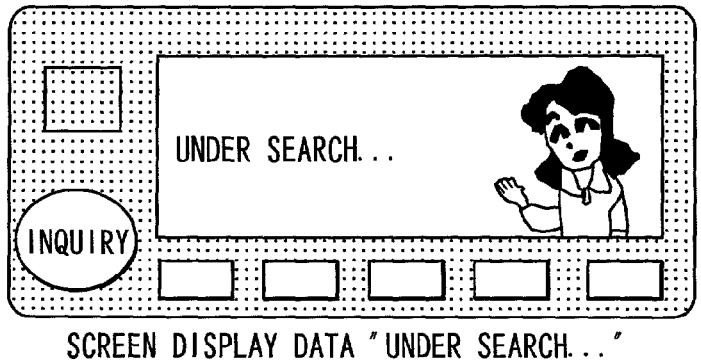
SCREEN DISPLAY DATA "UNDER SEARCH..."

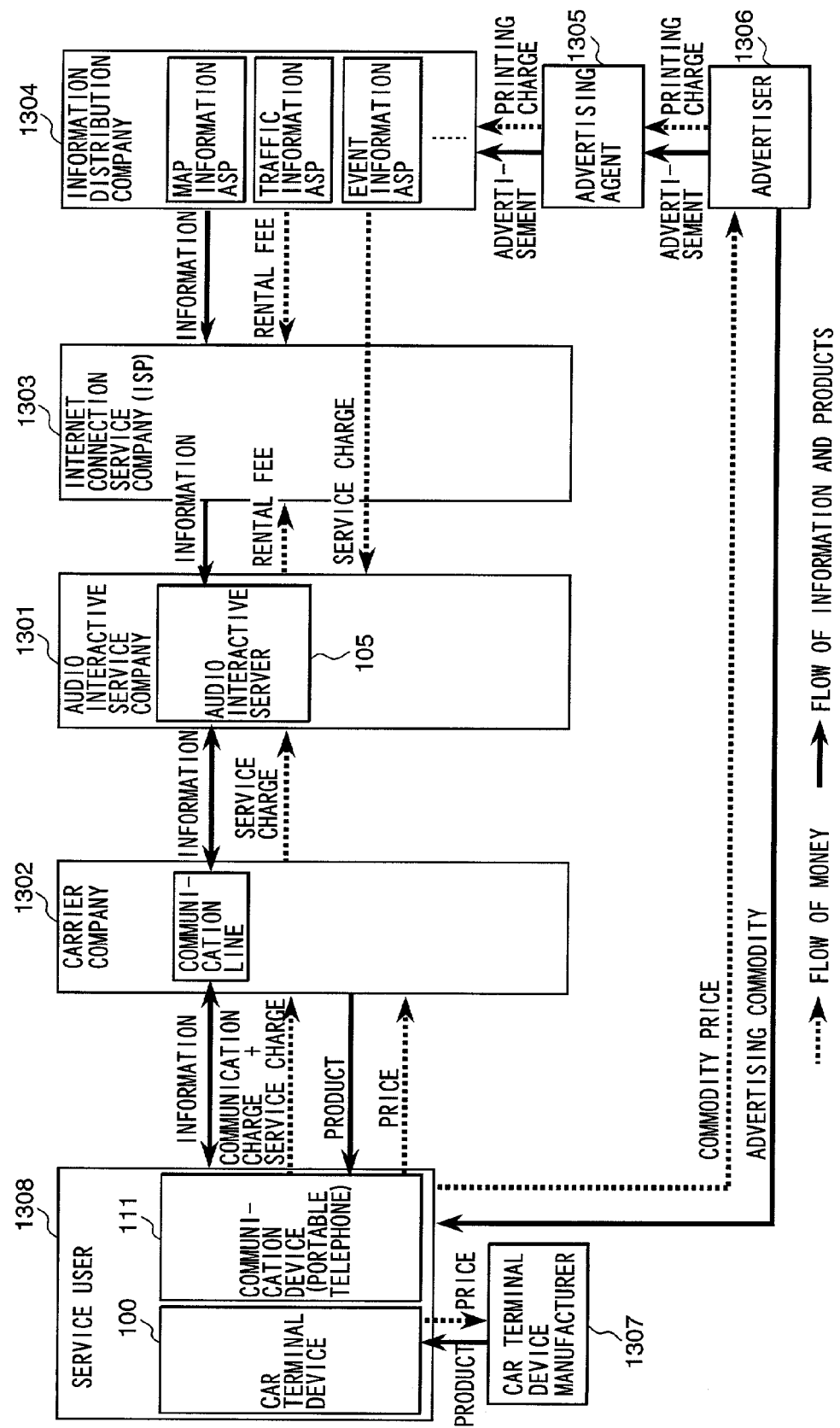

AUDIO INTERACTIVE NAVIGATION SYSTEM, MOVING TERMINAL DEVICE, AND AUDIO INTERACTIVE SERVER

BACKGROUND OF THE INVENTION

The present invention relates to a car navigation art for receiving information and services from an information distribution service provider for distributing map information and traffic information by accessing a network by voice from a moving terminal device such as a car.

As a car navigation art for inputting and executing destination setting and telephone number access by holding a conversation by voice, Japanese Application Patent Laid-Open Publication No. Hei 11-14394 (quoted example 1) may be cited. Further, as an art for accessing information on Internet from voice of a telephone set, Japanese Application Patent Laid-Open Publication No. Hei 10-271223 (quoted example 2) and Japanese Application Patent Laid-Open Publication No. Hei 10-177469 (quoted example 3) may be cited.

In the quoted example 1 of the prior art mentioned above, voice recognition is executed by a car terminal device and used for an operation command such as a menu and destination setting such as an address and land mark. However, there are problems imposed in the audio interaction that only voice based on a predetermined interaction can be input in relation to the CPU capacity of the car terminal device and moreover, various information on the Internet cannot be used synthetically. Further, the car terminal device has functions of car navigation and voice recognition, so that it is an expensive terminal. Further, map information is stored in CD-ROM or DVD-ROM, so that there is another problem imposed in maintenance such as periodic updating.

Furthermore, in the quoted examples 2 and 3, voice data input by voice is recognized by a voice-Internet gate way or a voice control host device connected to the Internet and on the basis of the result, access to the Internet and searching for information can be made possible. However, a problem arises that the audio interaction is not flexible such that only one object service can be given. Namely, there is a problem imposed that depending on information service distribution, the audio interaction method and voice recognition subject words are different and the quoted examples cannot correspond to them flexibly. In an environment that an instruction can be issued only by voice, map information such as destination setting and traffic information such as traffic congestion cannot be accessed simply.

SUMMARY OF THE INVENTION

In consideration of the above-described problems, the present invention is aimed at providing a car navigation art for receiving information and services from an information distribution service provider for distributing map information and traffic information by accessing a network by voice from a moving terminal device such as a car.

Thus, in the present invention, a car navigation system for, at the time of desiring map information, traffic information, and other required information in a car, inquiring an information distribution service provider for distribution the aforementioned information is composed of a moving terminal device which can be operated by inputting and outputting voice, a communication device, an audio interactive server which can input and output voice and data, is connected to an external device and the Internet on the basis of audio interactions by the voice recognition process and voice synthesis process, and executes information transfer, and one or a plurality of information distribution service providers connected to the Internet for distributing information such as map information and traffic information.

Further, the moving terminal device is equipped with a means for calling the audio interactive server by one operation such as pressing a button and establishing communication. By doing this, the driver operability can be improved.

Further, the moving terminal device is structured so as to receive non-voice data from the audio interactive server and display characters and images on the screen of the moving terminal device. By doing this, intermediate results of the interaction contents can be displayed, so that the operability can be improved.

Further, when effective information such as individual information is input to the communication device beforehand and the communication device is installed at a predetermined location of the moving terminal device, the moving terminal device is structured so as to automatically establish communication with the audio interactive server and transmit the information to the audio interactive server. By doing this, information distribution services can be realized in accordance with individual desire.

Further, when the communication device is installed at the predetermined location of the moving terminal device, the moving terminal device is structured so as to automatically establish communication with the audio interactive server and receive effective information such as the history at the time of previous access from the audio interactive server. By doing this, for example, the destination can be set in the previous history information and the operation is simplified.

Further, the moving terminal device is structured so as to switch voice output between voice output from the audio interactive server and voice output in the moving terminal device after the moving terminal device receives voice data having a specific meaning such as interaction end from the audio interactive server or after the moving terminal device outputs voice data having a specific meaning such as interaction end. By doing this, in a case of typical synthesis guidance, the communication time can be shortened.

Further, the moving terminal device is structured so as to automatically transmit predetermined information of non-voice such as present location information held in the moving terminal device to the audio interactive server after the moving terminal device receives voice data having a specific meaning such as interaction end from the audio interactive server or after the moving terminal device outputs voice data having a specific meaning such as interaction end. By doing this, the protocol between the moving terminal device and the audio interactive server can be shortened.

Further, when the audio interactive server requests connection to the moving terminal device via the communication line, the moving terminal device is structured so as to have a certification process function for identifying from a voice response by the moving terminal device that the communication partner is a one from the audio interactive server. By doing this, the audio interactive server can reconnect the voice line whenever necessary and the communication charge can be reduced.

Further, the audio interactive server is structured so as to have a command conversion processing unit for performing the voice recognition process on the basis of the input voice, analyzing the contents of the obtained recognition result data, and generating a command to be transferred to the information distribution service provider. By doing this, the audio interactive server can correspond flexibly to the service provider for distributing various information.

Further, the audio interactive server is structured so as to internally have an interaction generation template having a described control flow for realizing a basic interaction and an interactive data generation unit for processing data on the basis of the interaction generation template and generating a control flow for realizing an audio interaction suited to obtain desired distribution information. By doing this, a unified interaction template is available and the operability is improved.

Further, the audio interactive server is structured so as to have an individual information management unit for controlling distribution information including individual information such as characteristics for each subject to be connected and the destination and route information of search results and to inquire a predetermined information distribution service provider about necessary traffic congestion information and event information via the Internet on the basis of the held route information of the subjects to be connected. By doing this, overall services can be given to each individual using map information and traffic information.

BRIEF DESCRIPTION OF THE DRAWINGS

FIG. 4 is a drawing showing a description example of the interaction generation template 307 when VoiceXML is used for the interaction description language of this embodiment.

FIG. 10 is a drawing showing an example of the output condition to the screen 104 of the car terminal device 100 under each interaction condition of this embodiment.

FIG. 13 is a drawing showing a business model example using the audio interactive navigation system of this embodiment.

DETAILED DESCRIPTION OF THE EMBODIMENTS

The embodiment of the present invention will be explained hereunder by referring to some drawings. In the embodiment, the moving terminal device will be explained as a car terminal device.

Figure 1:
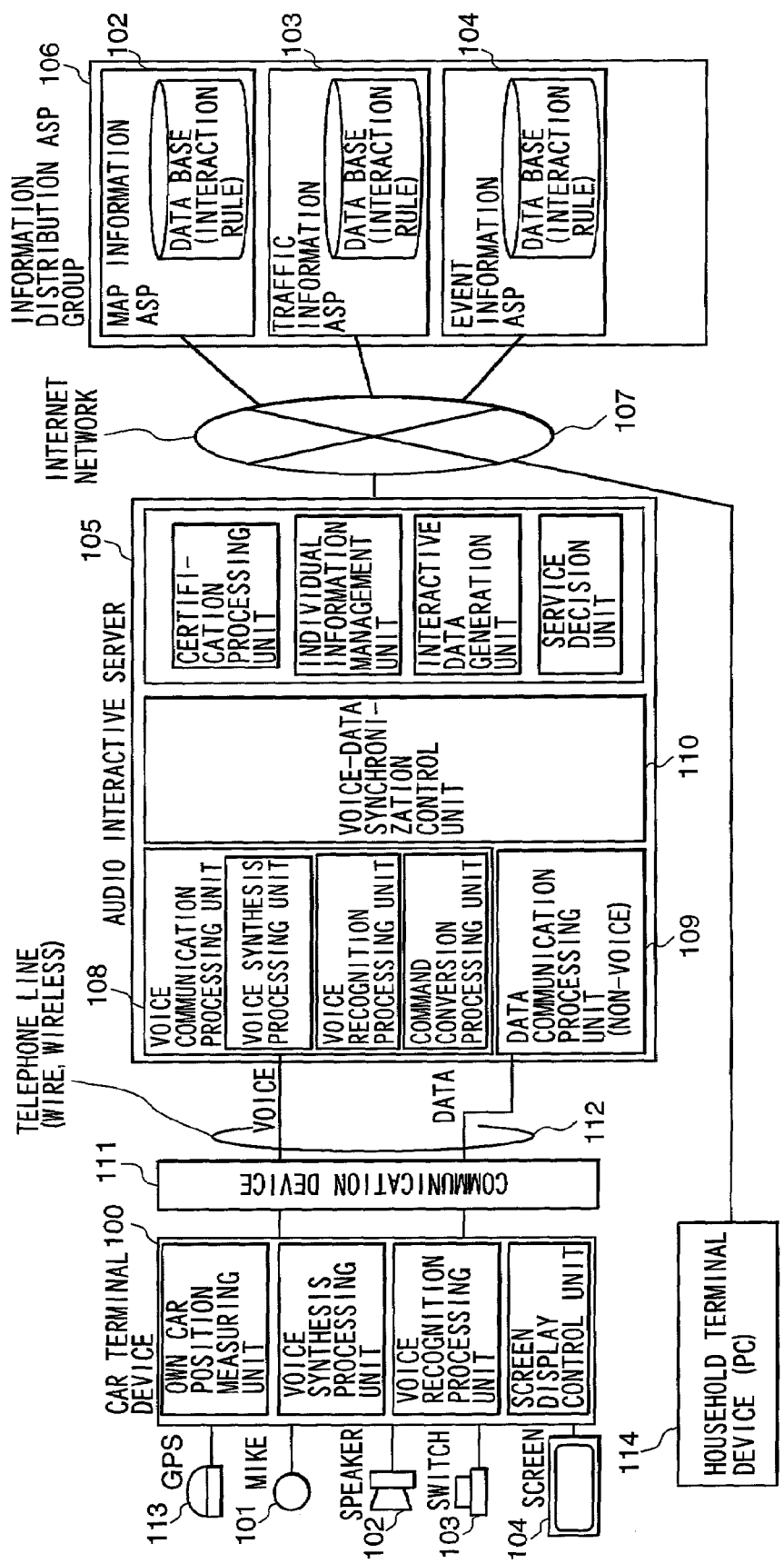
FIG. 1 is a drawing showing the whole constitution of the audio interactive navigation system of this embodiment.

FIG. 1 is an overall block diagram of the audio interactive navigation system of the present invention.

A car terminal device 100 is connected to a mike 101 for realizing voice input, a speaker 102 for outputting voice, a switch 103 for inputting a desired instruction to the car terminal device 100, and a screen 104 which is a data output. The car terminal device 100 internally has a processing unit for realizing voice synthesis of a simple fixed form of sentence with voice recognition and a screen display control unit for displaying desired data on the screen 104. Further, the car terminal device 100 is connected to a GPS 113 having a sensor for executing position measurement and can uniquely measure the position of a car itself.

Further, an audio interactive server 105 and an information distribution service provider (hereinafter referred to as an ASP) 106 for distributing useful information for the navigation of the present invention are connected to each other via a network 107 of the Internet and permit input and output of various kinds of information.

The audio interactive server 105 has a voice communication processing unit 108, a data communication processing unit 109, a voice-data synchronization control unit 110, and various processing units for realizing functions. A detailed constitution of each unit will be described later.

The group information distribution ASP group 106 includes a map information ASP for distributing route information on the basis of the data base concerning maps, a traffic information ASP for distributing a congestion condition of a road and an accident condition on the basis of the data base concerning traffic, and an event information ASP for distributing information of various events.

The car terminal device 100 is connected to the audio interactive server 105 via a telephone line 112 using a communication device 111 and outputs and inputs voice and data. In this explanation, the communication device 111 can be removed from a car and is installed in the neighborhood of the car terminal device 100 when the car is in use and in the other cases, a user can carry and use it.

Further, this system is connected to the Internet network 107 using a household terminal device 114 capable of being connected to the Internet such as a personal computer and the services given by this system can be used.

Figure 2:
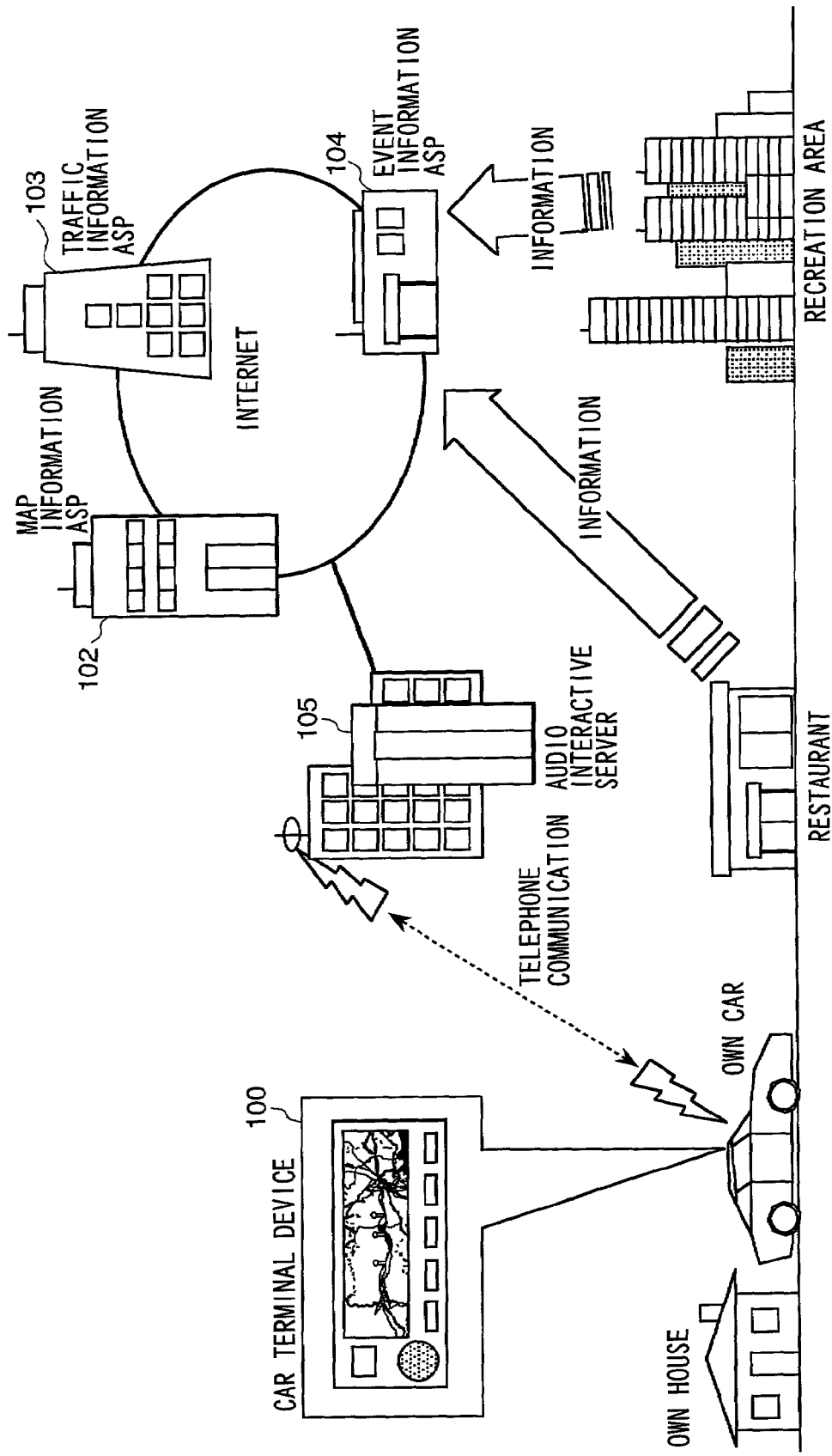
FIG. 2 is a drawing showing a service use example of this embodiment.

FIG. 2 shows a service use example using the present invention in this embodiment.

Hereunder, the service use example in this embodiment will be explained on the consumption of a case that a user makes a trip to Park A. As shown in the drawing, the building where the audio interactive server 105 is installed and each ASP for executing the information distribution service are at distant places, and the route information up to the destination is provided by the map information ASP, and the operation information concerning a plurality of restaurants in Park A which is the destination and on the moving routes is information collected by the event information ASP. Further, the congestion condition of roads including the moving routes of the user and accident information are successively collected by the traffic information ASP.

Figure 3:
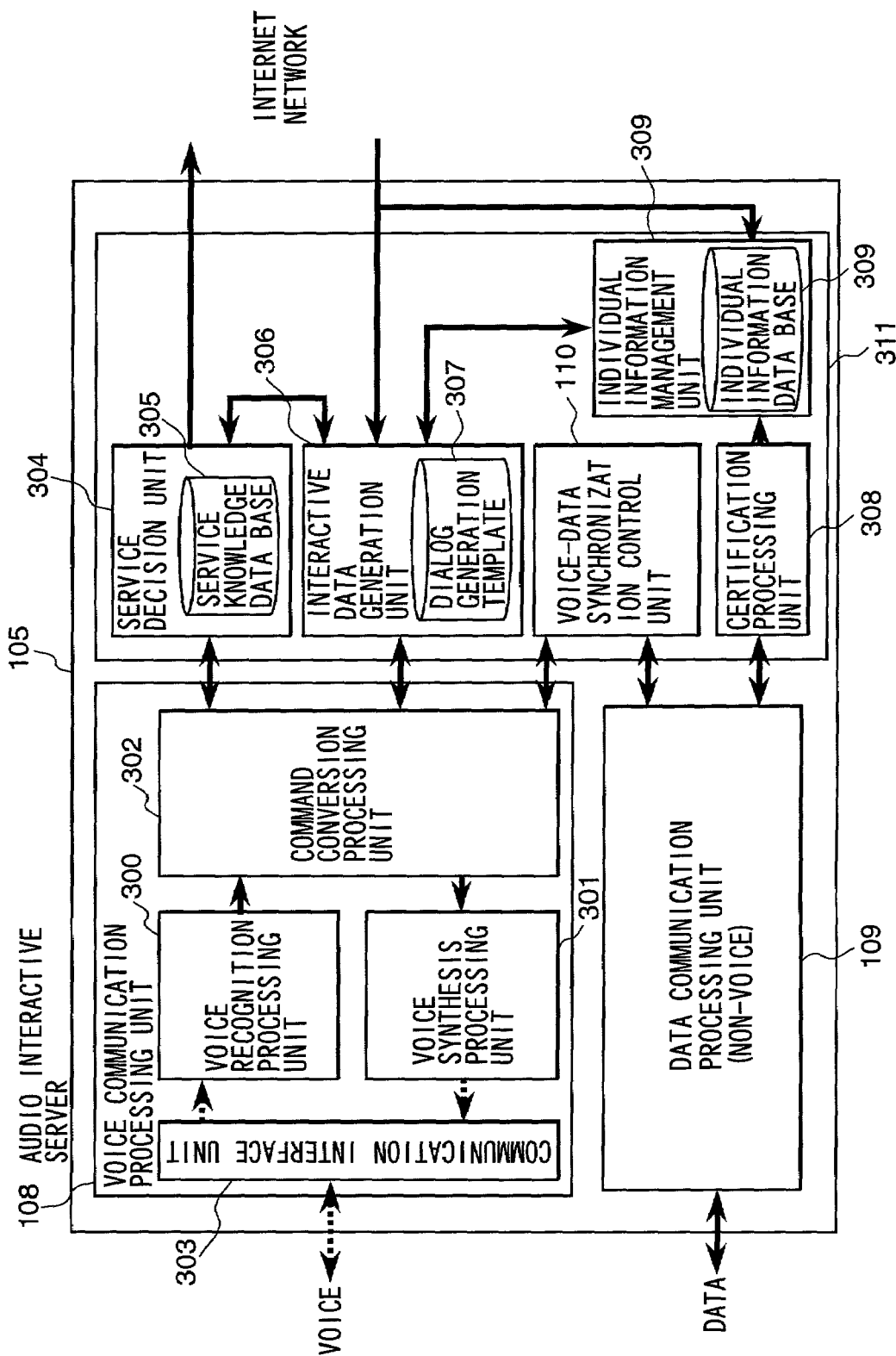
FIG. 3 is a drawing showing detailed constituent blocks of the audio interactive server 105 of this embodiment.

FIG. 3 is a detailed block diagram of the audio interactive server 105.

The audio interactive server 105 is large and composed of the voice communication processing unit 108 for performing the voice communication process, the data communication processing unit 109 for performing the non-voice communication process, and a processing unit 311 for performing the other processes.

The voice communication processing unit 108 is composed of a voice recognition processing unit 300 for recognizing input voice and converting it to text data, a voice synthesis processing unit 301 for converting the text data to voice data, a command conversion processing unit 302 for performing the process for converting the text data of the voice recognition processing process 300 to a command for instructing the host CPU and the process for converting the high-order command to text data which is a subject of voice output and outputting it to the voice synthesis processing unit 301, and a calling interface unit 303 for controlling input and output to and from the external communication line and voice communication processing unit. When VoiceXML which is one of marking languages capable of expanding the standard is to be used to realize an audio interaction, the command conversion processing unit 302 is equivalent to the part for performing the interpreter process capable of analyzing the description of VoiceXML.

The data communication processing unit 109 is a unit for performing the communication process excluding voice interaction and processes packeted data communication.

The voice-data synchronization control unit 110 controls mutual outputs of the voice communication processing unit 108 and the data communication processing unit 109. The voice-data synchronization control unit 110 mainly conducts synchronization control of data to be displayed on the screen 104 of the terminal during voice output to the car terminal device 100.

A service decision unit 304 is a unit for deciding what service information is desired by the command converted by the command conversion processing unit 302, which understands the command on the basis of a service knowledge data base 305 stored internally, selects the necessary subject ASP, and transmits command data for obtaining service information to the external Internet network.

An interactive data generation unit 306 receives service information data obtained from the external ASP, generates audio interaction command description on the basis of an interaction generation template 307 internally held, and outputs it to the command conversion processing unit 302.

A certification processing unit 308 receives ID information of a user transmitted from the car terminal device 100 and identifies the user. By this information, the certification processing unit 308 can identify the car of the subject user to be connected and can reconnect it after certification.

Further, the user information obtained by the certification processing unit 308 is transmitted to an individual information management unit 309 as individual information for each user and stored in an individual information data base 310. The individual information data base 310 can additionally store a user history such as past information search results of each user. The individual information management unit 309 transfers these stored information for each individual user to the interactive data generation unit 306 and the individual information is used as reference for generation of an audio interactive model characterized for each user at the time of service use.

FIG. 4 shows a description example 401 of the interaction generation template 307 when VoiceXML is used for the interaction description language and an example 402 using the template. In the interaction generation template 307, the constitution as a basis of interaction is described and the interactive data generation unit 306 embeds a necessary interaction character string, interaction syntax information, and information such as the location of the obtained destination ASP according to the condition, thereby generates an actual interaction description. On the lower part of FIG. 4, a character string embedding example at the time of location designation and an actual interaction execution example are indicated.

Figure 5:
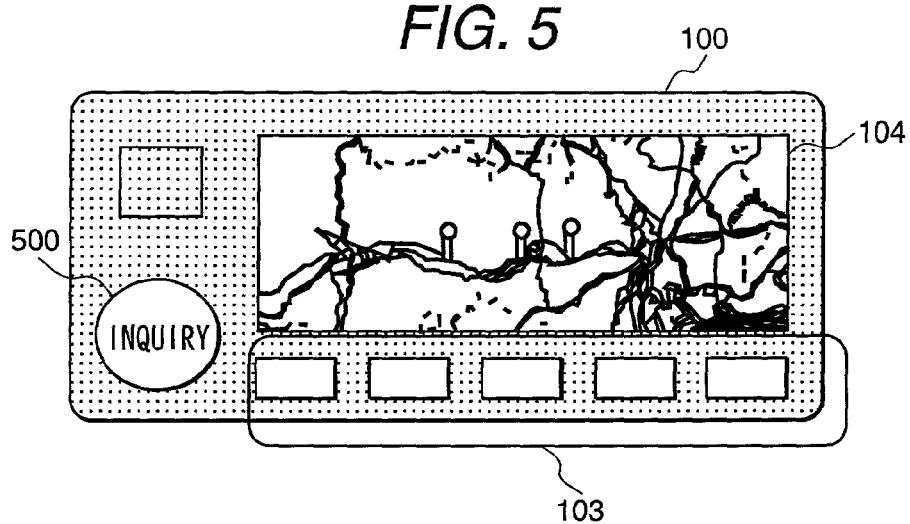
FIG. 5 is a drawing showing an example of product configuration of the car terminal device 100 of this embodiment.

FIG. 5 shows an example of product configuration of the car terminal device 100.

AS shown in the drawing, there are the screen 104 and some switches 103 provided on the front of the device. Information necessary for navigation is displayed on the screen 104, and the display contents are changed over by the switches 103, and various instructions can be given to the car terminal device 100. Further, the car terminal device 100 has an inquiry button 500 having a function for establishing a communication line for the audio interactive server 105 by one operation. Namely, only by pressing the inquiry button 500, a connection for automatically making a telephone call to the audio interactive server 105 and enabling telephone conversation by voice hereafter can be established.

Next, each processing flow will be explained according to the actual use example.

Figure 6:
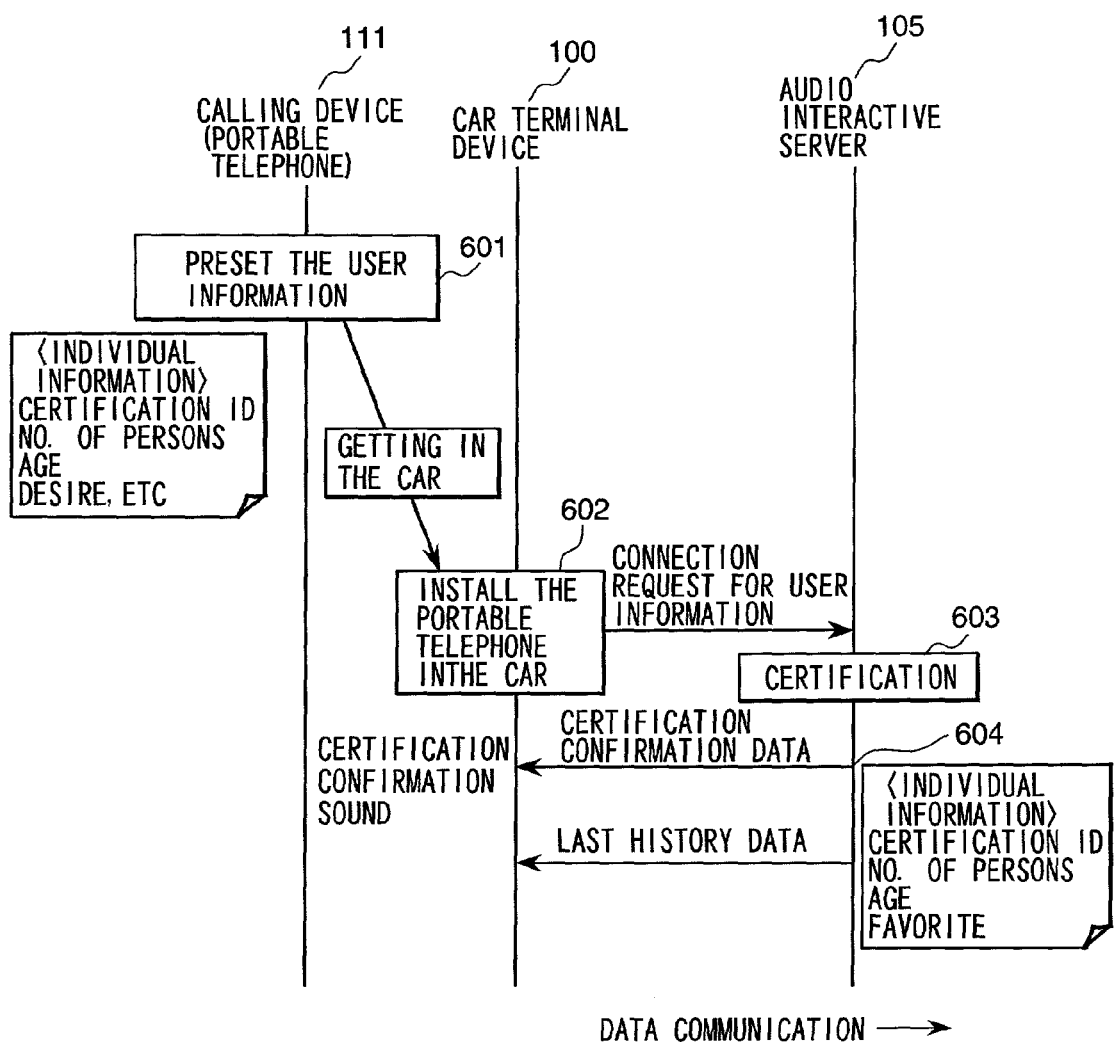
FIG. 6 is a drawing showing the certification processing flow from the car terminal device 100 of this embodiment to the audio interactive server 105.

FIG. 6 shows a processing flow of certification when the first connection is established from the car terminal device 100 to the audio interactive server 105 in this system.

Firstly, before starting to the destination, a user inputs individual information such as ID information for certification, the number of trip participants, age of each participant, desire of a meal, and desire of an event to the communication device 111. (Step 601)

The user gets in a car at the time of start and firstly installs the communication device 111 in the car. (Step 602)

When confirming the installation of the communication device 111, the car terminal device 100 establishes data communication for the audio interactive server 105. Thereafter, the car terminal device 100 starts transmission of the individual information input in the communication device 111 beforehand to the audio interactive server 105. The audio interactive server 105 confirms by the internal certification processing unit 308 that the car terminal device 100 is in the operation state on the basis of the ID information included in the received individual information, completes certification, and transmits certification confirmation data to the car terminal device 100. Upon receipt of the certification confirmation data, the car terminal device 100 outputs a predetermined sound or voice and notifies the user of completion of certification. (Step 603)

Thereafter, the audio interactive server 105 obtains desired information of the user confirmed by certification from the individual information data base 310 and transmits it to the car terminal device 100. (Step 604)

In this flow, as another method of the means for giving the individual information input beforehand at Step 601 to the audio interactive server 105, there is a means for connecting to the audio interactive server 105 via the Internet network 107 using the household terminal device 114 such as the PC shown in FIG. 1 and giving the individual information beforehand. In this case, the car terminal device 100 transmits the ID information to the audio interactive server 105 by input indicating that the user gets in the car, thereby performs the certification process.

Figure 7:
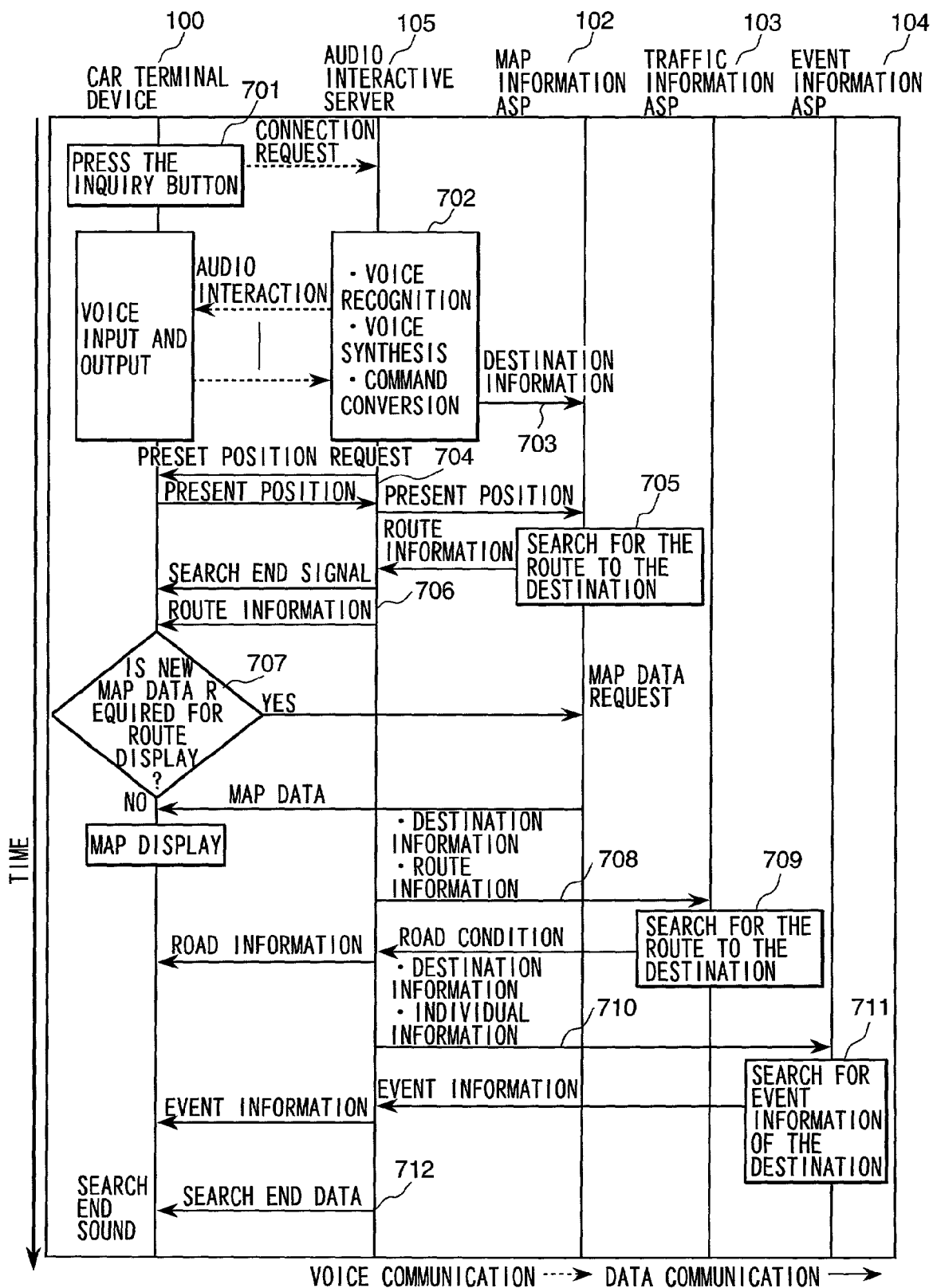
FIG. 7 is a drawing showing the processing flow of an example of navigation services by audio interaction of this embodiment.

FIG. 7 shows the process flow of an example of the navigation services by audio interaction in this audio interactive navigation system. The process flow will be explained hereunder using the schematic diagram of the audio interactive server 105 shown in FIG. 3.

When the user intends to receive the service of this system in the car, he firstly presses the inquiry button 500 of the car terminal device 100 and establishes the communication line with the audio interactive server 105. (Step 701)

Upon receipt of it, the audio interactive server 105 generates a audio interactive description necessary to the first audio interaction by the interactive data generation unit 306 and returns a voice response to the car terminal device 100 via the voice communication processing unit 108. The first voice output to be received from the audio interactive server 105 in this case is preferably words for obtaining the request of the user such as "What?". In this example, the user desires assistance for the driving route including route search, so that he responds in voice including a predetermined keyword such as "Route assistance, please". Upon receipt of the voice response of the user, the audio interactive server 105 understands that the request of the user is "Route assistance" by the service decision unit 304 via the voice recognition processing unit 300 and the command conversion processing unit 302 in the voice communication processing unit 108.

The service decision unit 304 understanding the request identifies the ASP of service request among the information distribution ASP group 106 on the basis of the information stored in the service knowledge data base 305 beforehand and transfers the interactive information prepared by the identified ASP to the interactive data generation unit 306. The interactive information prepared by the ASP is listed inquiry information to a user for service offer to him. The interactive information obtaining method may be a method for obtaining interactive information of all the ASPs of service offering subjects beforehand and storing it in the service knowledge data base 305 beforehand or a method for receiving a request from a user and then successively obtaining interactive information for the ASP by the service decision unit 304. The interactive data decision unit 306 prepares concrete interactive data for obtaining a detailed request from the user on the basis of the received ASP interactive information and the interaction generation template 307 and transfers it to the command conversion processing unit 302. The received interactive data is converted to voice output data by the command conversion processing unit 302 and additionally the data is converted to voice by the voice synthesis processing unit 301 and transmitted to the car terminal device 100, thus an interaction with the user for obtaining necessary information is realized. The concrete interaction for obtaining the information will be described later. (Step 702)

This example will be explained on the assumption that the aforementioned user desires "traffic information and event information on moving route" in addition to route assistance.

When the interaction with the user ends and information necessary to route assistance is obtained, the audio interactive server 105 transmits the destination information obtained by the interaction to the map information ASP. (Step 703)

Furthermore, the audio interactive server 105 requests the present position information to the car terminal device 100 and obtains the present position information of the car of the user. (Step 704)

The present position information obtaining method in this case, instead of the method for responding by the car terminal device 100 by a request from the audio interactive server 105, may be a method for automatically transmitting the present position data of the car by the car terminal device 100 after the car terminal device 100 detects voice indicating end of the audio interaction at Step 702 from the audio interactive server 105 or may be a method for automatically transmitting the present position data of the car by the car terminal device 100 after the car terminal device 100 responds to voice indicating end of the audio interaction at Step 702.

When the obtained present position information is transmitted to the map information ASP, the map information ASP searches for the route to the destination on the basis of the destination information and present position information. (Step 705)

The audio interactive server 105 receiving the searched route information from the map information ASP transmits the route information of searching result to the car terminal device 100 together with the detection end signal. (Step 706)

The car terminal device 100 indicates the route on the map displayed on the screen 104 on the basis of the received route information. When new map data is necessary at that time, the car terminal device 100 directly inquires the map information ASP, obtains the necessary map data, and displays a map. (Step 707)

Furthermore, the audio interactive server 105 confirms by the audio interaction at Step 702 that the user also desires "traffic information and event information on moving route", so that the audio interactive server 105 requests a traffic information search on the route to the traffic information ASP after the previous inquiry to the map information ASP is completed. The previously obtained destination information and present position information of the user are stored in the individual information data base 310 in the audio interactive server 105, so that the audio interactive server 105 transmits also these information to the traffic information ASP when requested. (Step 708)

Upon receipt of the request, the traffic information ASP searches for information on the basis of the received traffic information on the route and transmits necessary road information such as congestion information and accident information on the route to the car terminal device 100 via the audio interactive server 105. (Step 709)

Further, separately, the audio interactive server 105 transmits the destination information and individual information such as desire of an event of the user which are stored in the individual information data base 310 to the event information ASP. (Step 710)

Upon receipt of the request, the event information ASP searches for information on the basis of the received destination information and individual information and transmits event information suited to the user to the car terminal device 100 via the audio interactive server 105. (Step 711)

Upon receipt of the answer from the event information ASP, the audio interactive server 105 judging that it obtains all necessary service information transmits the search end data to the car terminal device 100. The car terminal device 100 outputs a predetermined sound or voice after receiving the search end data and notifies the user of search end. (Step 712)

Inquiries to these plurality of ASPs may be executed sequentially or in parallel.

Figure 8:
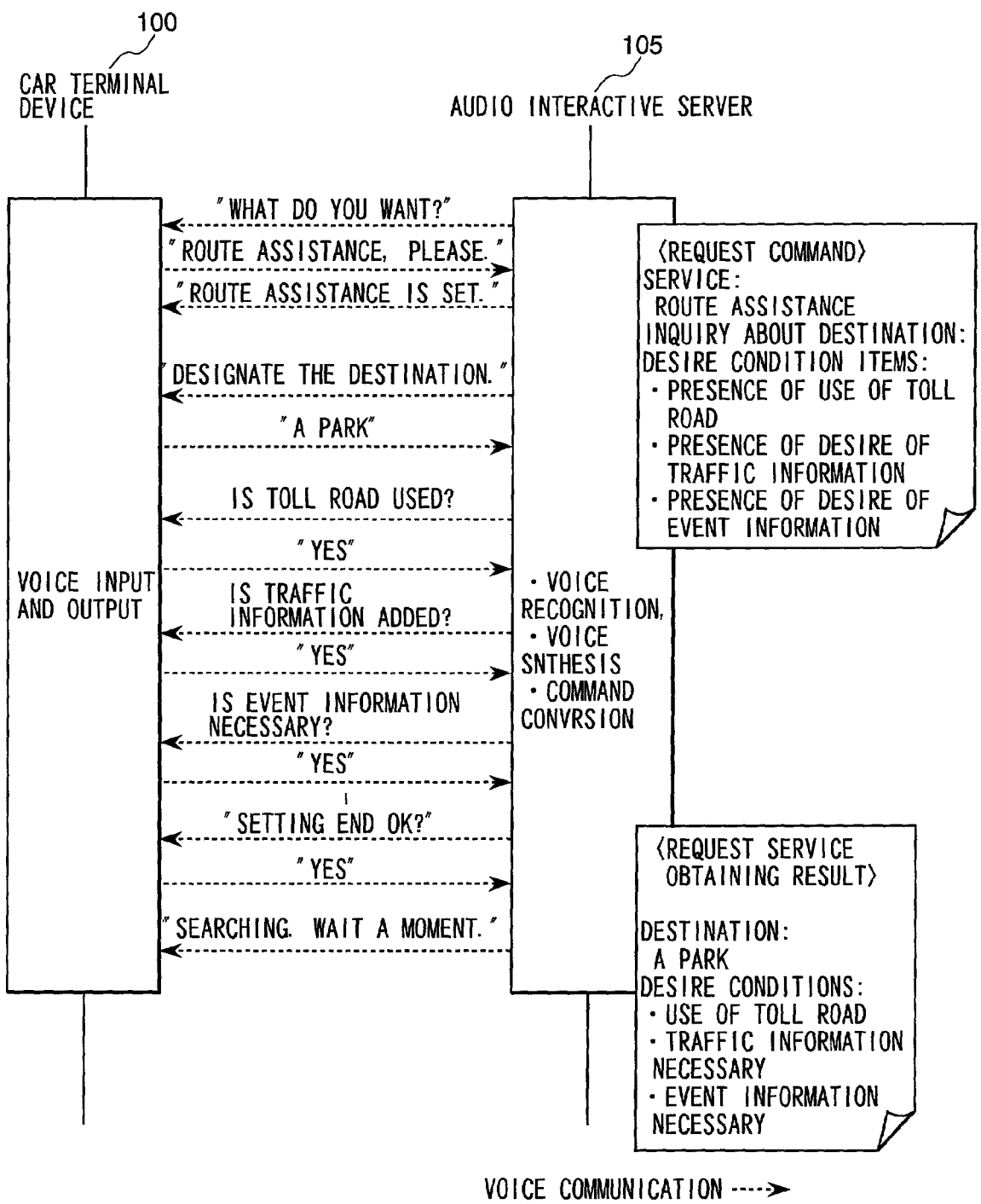
FIG. 8 is a drawing showing the detailed flow of the audio interaction at Step 702 shown in FIG. 7 in this embodiment.

FIG. 8 shows a detailed flow of the audio interaction at Step 702 shown in FIG. 7 mentioned above.

At the stage that the service offering subject of the user is found to be route assistance from the first interaction, the audio interactive server 105 obtains the necessary request command from the service knowledge data base 305. In this case, the audio interactive server 105 obtains, as "destination inquiry" and a desired condition item, request commands of "existence of use of toll road", "existence of desire of traffic information", and "existence of desire of event information". On the basis of these request commands, the audio interactive server 105 prepares interactive data by the interactive data generation unit 306 and obtains information of each item from the user in the interactive form as shown in the drawing using the command conversion processing unit 302, the voice recognition processing unit 300, and the voice synthesis processing unit 301.

During the audio interaction between the user and the audio interactive server 105, pictures corresponding to interaction contents can be displayed on the screen 104 of the car terminal device 100.

Figure 9:
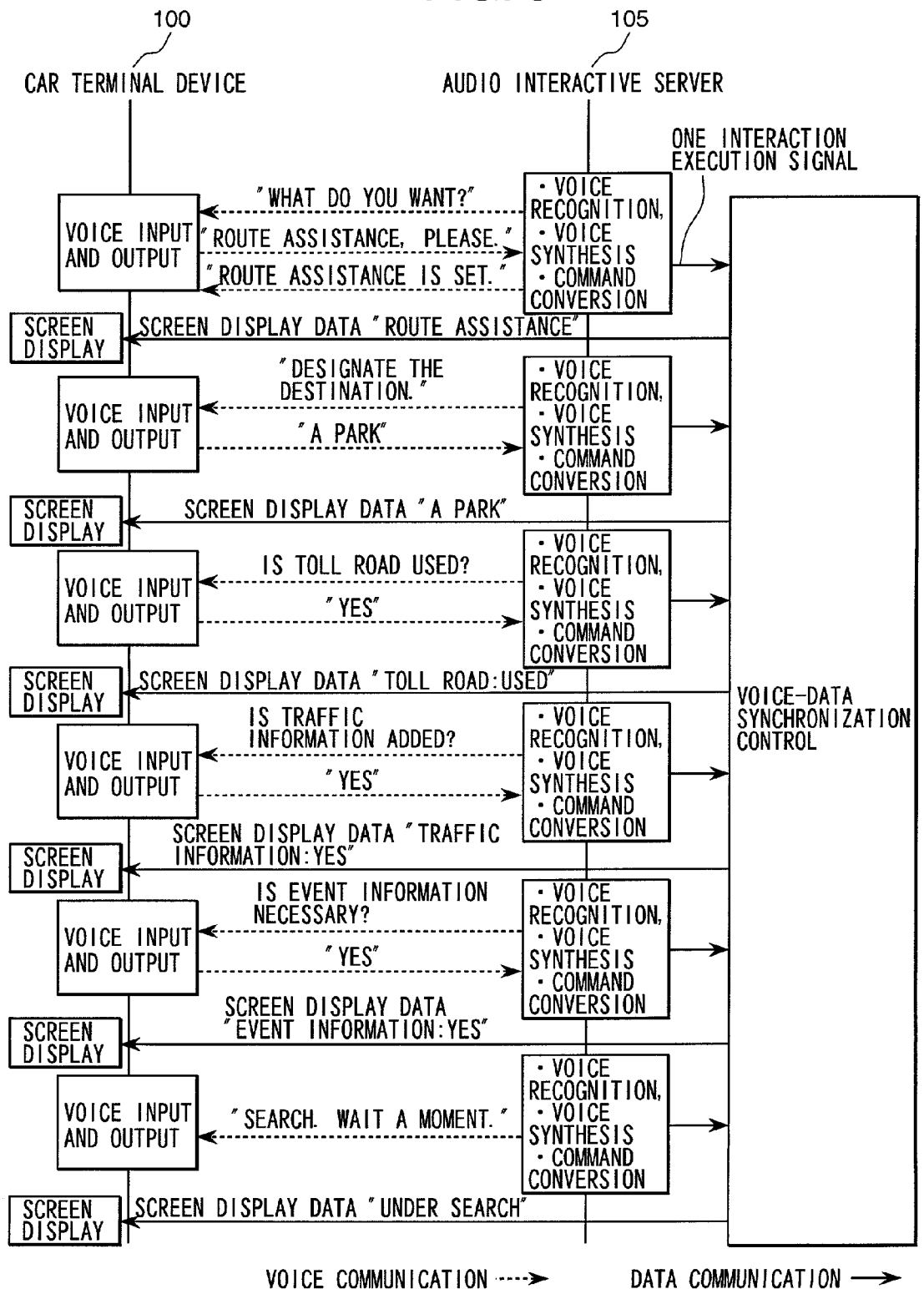
FIG. 9 is a drawing showing the detailed flow of a case accompanied by screen output during the audio interaction at Step 702 shown in FIG. 7 in this embodiment.

FIG. 9 shows a detailed flow when screen output is accompanied during the audio interaction at Step 702 mentioned above.

As shown in the drawing, whenever the basic interaction is executed between the user and the audio interactive server 105, the command conversion processing unit 302 transmits a signal indicating one interaction execution or completion to the voice-data synchronization control unit 110. The voice-data synchronization control unit 110 obtains the screen display information corresponding to interaction stored in the service knowledge data base 305, transmits the screen display information synchronized with the audio interaction to the data communication processing unit 109, and transfers it to the car terminal device 100.

Upon receipt of the information, the car terminal device 100 successively displays necessary information on the screen 104 on the basis of the data contents.

FIG. 10 shows examples of output conditions onto the screen 104 of the car terminal device 100 in each interaction state.

In this way, in synchronization with the contents of each audio interaction in execution, the interaction contents and results obtained by interaction can be displayed on the screen.

The voice output of a fixed form of sentence such as "What?" at the beginning of interaction and "Search. Wait a moment" at the last of interaction which are explained previously may be voice output from the audio interactive server 105 or voice output stored in the car terminal device 100 by the car terminal device 100 itself using voice data.

In the latter case, it is desirable to switch the voice output subject using the interaction contents executed between the car terminal device 100 and the audio interactive server 105 and data transferred between them as a trigger. For example, the voice output "What?" may be switched to an internal voice data output after the car terminal device 100 confirms that the first connection request is established and the last voice output "Search. Wait a moment" may be automatically switched to an internal voice data output after the car terminal device 100 detects an interaction of "setting end or not".

The above explanation is made on the assumption of the service request of "route assistance". Also when service information other than that is to be obtained, a flow that interaction is activated by pressing the inquiry button 500, and necessary information is extracted by the interaction with the audio interactive server 105, and the audio interactive server 105 requests the information distribution service provider group 106, and the results are obtained by the user is almost the same.

This audio interactive navigation system, separately from the so-called inquiry type navigation information obtaining method mainly by a user explained above, also provides a navigation information obtaining method for positively offering information to a user mainly by the audio interactive server 105. For example, when the user is moving to the destination and the road condition on the moving route is congested extremely due to an unexpected situation, a service of transmitting information of a difficult traffic condition due to an accident to the user may be cited.

Figure 11:
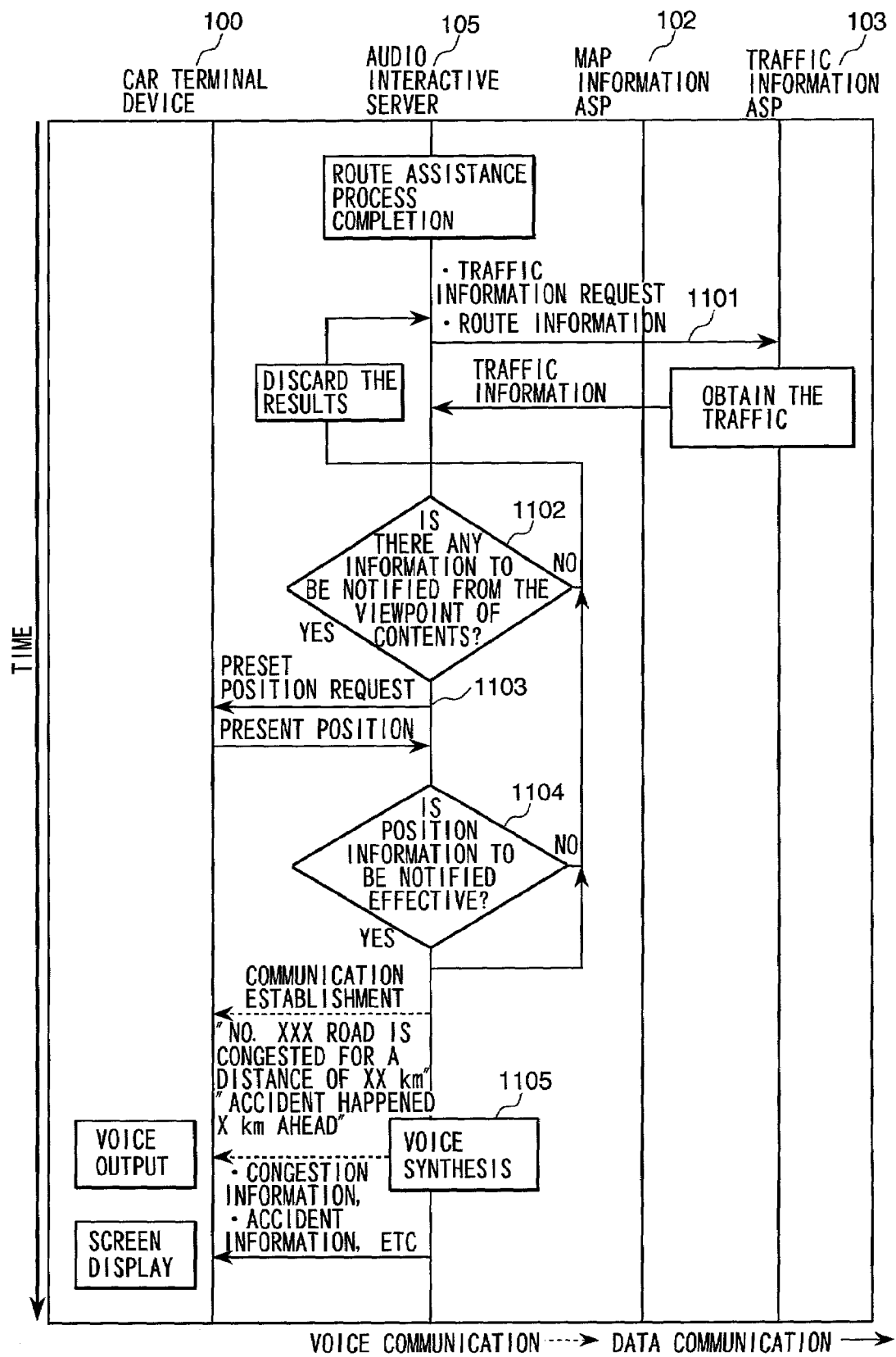
FIG. 11 is a drawing showing the processing flow of offering traffic information to the car terminal device 100 from the audio interactive server 105 when the traffic information is changed on the route of this embodiment.

FIG. 11 shows a processing flow of offering information to the car terminal device 100 from the audio interactive server 105 when the traffic information on the searched route is changed.

The assumption in this case is that the user already finishes the certification and route search up to the destination and the user moves to the destination on the basis of the route searching results. Further, the route information of the user is already stored in the individual information data base 310 in the audio interactive server 105 and the audio interactive server 105 can optionally refer to the route information.

The audio interactive server 105 completes the route assistance process shown in FIG. 2, obtains the route information of the user, then periodically transmits a traffic information request and the obtained route information to the traffic information ASP, and obtains traffic information around the route from the traffic information ASP. (Step 1101)

The audio interactive server 105 checks the contents of the traffic information obtained by the service decision unit 304 and judges whether there is information to be notified to the user from the viewpoint of contents such as unexpected traffic congestion or an accident or not. When the audio interactive server 105 judges that there is no need to notify, it discards the result from the ASP, outputs a traffic information request and the route information to the traffic information ASP again, and continues the periodic process. (Step 1102)

On the other hand, when the audio interactive server 105 judges that the contents to notify to the user are included, it outputs a present position request to the car terminal device 100 of the user and obtains latest information of the present position of the user. (Step 1103) As an other method for obtaining the present position, under the condition that the car terminal device 100 cannot accept the present position request depending on the car condition of the user, a method for inferring the present position by the information stored in the individual information data base 310 such as the car speed condition obtained beforehand is available.

The audio interactive server 105 checks the traffic information previously obtained with the car position information of the user and judges whether the information to be notified to the user is effective or not from the position relationship of the car. When the audio interactive server 105 judges that there is no need to notify, it discards the result from the ASP, outputs a traffic information request and the route information to the traffic information ASP again, and continues the periodic process. (Step 1104)

When the information to be notified to the user is effective, the audio interactive server 105 generates audio interactive data including the information to be notified by the interactive data generation unit 306, establishes the communication line to the car terminal device 100 of the subject car, and then executes voice output to the car terminal device 100 via the command conversion processing unit 302 and the voice synthesis processing unit 301. Whenever necessary, the audio interactive server 105 transmits the congestion information and accident information for screen display in synchronization. (Step 1105)

When a different request such as route changing is generated due to the obtained information, the user inquires the audio interactive server 105 again according to the flow shown in FIG. 7 and updates the information.

As a different constitution of the audio interactive navigation system of the present invention, there is a constitution available that the unit concerning the voice communication process in the audio interactive server is built in the car terminal device.

Figure 12:
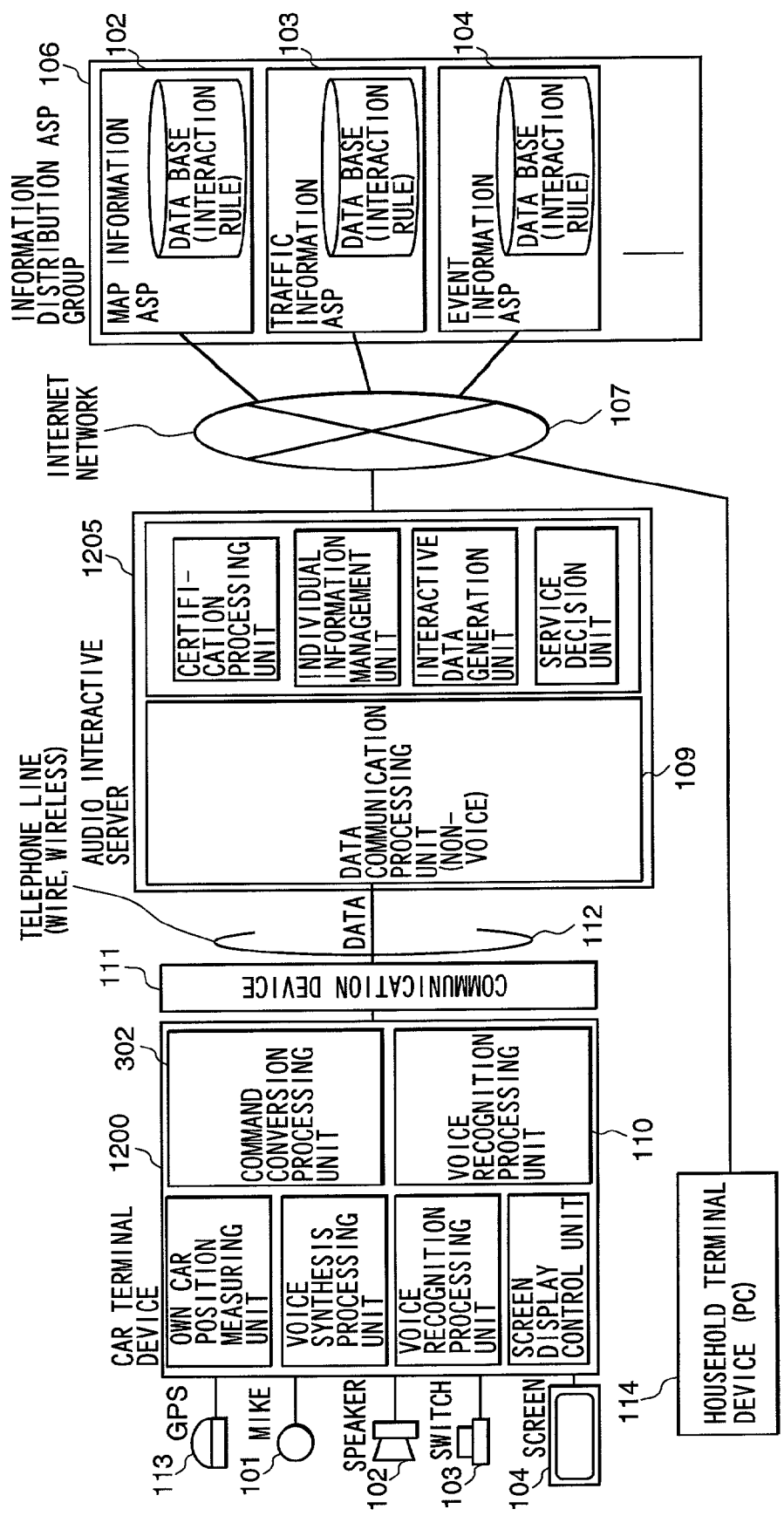
FIG. 12 is a drawing showing the whole constitution of the audio interactive navigation system when the voice communication processing unit of this embodiment is built in the car terminal device.

FIG. 12 is another whole block diagram of the audio interactive navigation system.

A car terminal device 1200 in this example internally has the voice recognition processing unit 300 and the voice synthesis processing unit 301 which are installed in the audio interactive server 105 and has a screen display control unit for displaying desired data on the screen 104. Furthermore, the car terminal device 1200 has the voice-data synchronization control unit 110 for synchronizing the screen output with the voice output. Furthermore, the car terminal device 1200 has the command conversion processing unit 302 for performing the process for converting the text data of the voice recognition processing process 300 to a command for instructing the host CPU and the process for converting the high-order command to text data which is a subject of voice output and outputting it to the voice synthesis processing unit 301. Further, the car terminal device 1200 is connected to the mike 101 for realizing voice input, the speaker 102 for outputting voice, the switch 103 for inputting a desired instruction to the car terminal device 1200, and the screen 104 which is a data output. Further, the car terminal device 1200 is connected to the GPS 113 having a sensor for executing position measurement and can uniquely measure the position of the car itself.

An audio interactive server 1205 in this example has a built-in unit concerning voice communication in the car terminal device 1200, so that the processing unit of the audio interactive server 105 concerning the unit is eliminated and the audio interactive server 1205 communicates with the car terminal device 1200 only by data communication.

The constitution units other than it are the same as those shown in FIG. 1.

In this constitution, the main part concerning the interface of audio interaction is executed by the car terminal device 1200 and a difference from the constitution explained previously is that data concerning voice exchanged between the car terminal device 1200 and the audio interactive server 1205 is interactive data such as VoiceXML.

Next, a business model example using the audio interactive navigation system of this embodiment will be explained.

FIG. 13 shows a business model example using the audio interactive navigation system of this embodiment.

The business model of this example includes an audio interactive service company 1301 for managing and operating the audio interactive server 105 explained above, a carrier company 1302 for supplying communication lines, an Internet connection service company 1303 for offering connection services with the Internet network 107, an information distribution company 1304 for distributing information such as map information ASP and traffic information ASP, an advertising agent 1305 for carrying an advertisement of products on the contents offered by the information distribution company 1304, an advertiser 1306 for manufacturing products to be advertised, a car terminal device manufacturer 1307 for manufacturing the car terminal device 100, and a service user 1308 for using this service using the car terminal device 100. The advertising agent 1305 may be managed by the advertiser 1306.

In FIG. 13, each arrow of a solid line indicates flow of information and products and each arrow of a dotted line indicates flow of money. The communication device 111 has a shape of a portable telephone and in this example, a method for buying and using the device from the carrier company 1302 is adopted. Namely, to use this service, firstly the service user 1308 must buy the car terminal device 100 from the car terminal device manufacturer 1307 and the communication device 111 from the carrier company 1302 by paying the prices for them to the companies. The car terminal device 100 may be incorporated in the car bought by the service user from the beginning.

The service user 1308 pays the communication charge to the carrier company 1302 so as to use the communication line. On the other hand, the carrier company 1302 offers the communication line to the service user 1308 or the audio interactive service company 1301 and requests the communication charge and service charge at the time of use of this service to the service user 1308. Then, the carrier company 1302 pays the amount equivalent to the service charge among the charge collected from the service user 1308 to the audio interactive service company 1301.

Further, the audio interactive service company 1301 for offering this service and the information distribution company 1304 for distributing service information make a contract with the Internet connection service company 1303 respectively so as to connect to the Internet and thereafter pay the rental fee under the contract.

The advertiser 1306 pays the advertisement charge to the advertising agent 1305 and requests advertisement and the advertising agent 1305 pays the printing charge to the information distribution company 1304 and requests to print the product information subjected to the advertisement request in the contents. The service user 1308, when he finds favorite product information from the obtained advertisement information, pays the product price and buys the product.

In addition to the aforementioned business model, a constitution that the communication device 111 is built in the car terminal device 100 may be used. In this case, the price of the communication device 111 is included in the price of the car terminal device 100.

According to the present invention, the audio interactive navigation system is composed of the moving terminal device capable of inputting voice, communication device, audio interactive server capable of executing voice recognition and synthesis which is to be connected to the information distribution service provider, and information distribution service provider including map information and traffic information, thus a plurality of information distribution services are joined synthetically and information desired by a driver can be offered. Further, the moving terminal device can be made inexpensive because the function is simplified. Further, necessary services can be given by voice, so that there is an effect produced that the operability is greatly improved.

What is claimed is:

1. A moving terminal device for outputting information obtained from an information distribution service provider, including map information, traffic information, and other required information, comprising:
   a voice input means for inputting voice commands of a driver;
   a voice output device for outputting voice data;

a communication device for communicating with an audio interactive server, which audio interactive server performs voice recognition processing and voice synthesis processing, said communications device establishing a connection to a communication line outside a car to transmit voice data input through said voice input means to said corresponding audio interactive server so as to perform audio interactive communication over said communication line for receiving results of said audio interactive communication from said audio interactive server in a form of voice or data;

a voice synthesis processing unit for outputting a stylized voice announcement using voice data held therein; and a voice recognition processing unit for recognizing audio interactive data communicated with said audio interactive server, wherein said moving terminal device receives information, including map information or traffic information returned as a result of interpretations and executions of voice commands input through said voice input means, which interpretations and executions are performed by said information distribution service provider; and switches voice output between voice output from said audio interactive server and voice output from said voice synthesis processing unit after said moving terminal device receives from said audio interactive server voice data having a specific meaning notifying of a termination of communication with said moving terminal device;

wherein when said communication device is installed in a predetermined place of said moving terminal device, said moving terminal device automatically establishes communication with said audio interactive server and receives effective information, including a history at the time of previous access from said audio interactive server.

2. An audio interactive server with navigation for, at the time of desiring map information, traffic information, and other required information in a car, inquiring an information distribution service provider for distribution said information and notifying a driver and a fellow passenger of said obtained information, comprising:

a command conversion processing unit for performing a voice recognition process on the basis of voice input to said audio interactive server, analyzing contents of said obtained recognition result data, and generating a command to be transferred to said information distribution service provider, wherein:

said audio interactive server has a processing unit for, when said moving terminal device cannot receive voice output data when said voice output data is to be transmitted to said moving terminal device, transmitting data of non-voice to said moving terminal device and notifying that there is voice output data to be received by said moving terminal device;

wherein said moving terminal device switches voice output between voice output from said audio interactive server and voice output from said voice synthesis processing unit after said moving terminal device receives from said audio interactive server voice data having a specific meaning notifying of a termination of communication with said moving terminal device.

* * * * *